(12) United States Patent
Zhang

(10) Patent No.: US 12,586,793 B2
(45) Date of Patent: Mar. 24, 2026

(54) ELECTROCHEMICAL DEVICE AND ELECTRONIC DEVICE

(71) Applicant: Ningde Amperex Technology Limited, Ningde City (CN)

(72) Inventor: Hanxiang Zhang, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 541 days.

(21) Appl. No.: 17/708,115

(22) Filed: Mar. 30, 2022

(65) Prior Publication Data

US 2022/0328832 A1 Oct. 13, 2022

(30) Foreign Application Priority Data

Mar. 31, 2021 (CN) .......................... 202110346819.3

(51) Int. Cl.
| | |
|---|---|
| *H01M 4/587* | (2010.01) |
| *H01M 4/02* | (2006.01) |
| *H01M 10/0568* | (2010.01) |
| *H01M 10/0569* | (2010.01) |

(52) U.S. Cl.
CPC ....... *H01M 4/587* (2013.01); *H01M 10/0568* (2013.01); *H01M 10/0569* (2013.01); *H01M 2004/021* (2013.01); *H01M 2004/027* (2013.01); *H01M 2300/0025* (2013.01)

(58) Field of Classification Search
CPC .. H01M 4/587; H01M 4/133; H01M 10/0568; H01M 10/0569; H01M 10/052; H01M 2004/021; H01M 2004/027; H01M 2300/025
See application file for complete search history.

(56) References Cited

U.S. PATENT DOCUMENTS

| | | | | |
|---|---|---|---|---|
| 2013/0260243 A1* | 10/2013 | Ikeda | ................... | H01M 4/485 429/218.1 |
| 2014/0242434 A1* | 8/2014 | Sasaki | .............. | H01M 10/0525 429/94 |
| 2014/0255796 A1* | 9/2014 | Matsuoka | ............. | H01M 4/139 429/188 |
| 2015/0325843 A1* | 11/2015 | Yoon | ..................... | H01M 4/387 29/623.5 |
| 2015/0333326 A1* | 11/2015 | Lee | ......................... | H01M 4/48 252/182.1 |
| 2019/0115621 A1* | 4/2019 | Kuratsu | ............ | H01M 10/0566 |
| 2019/0326641 A1* | 10/2019 | Dou | ................... | H01M 10/0567 |
| 2020/0274164 A1 | 8/2020 | Nakano et al. | | |
| 2020/0313199 A1* | 10/2020 | Blin | ........................ | H01G 11/70 |

FOREIGN PATENT DOCUMENTS

| | | | | |
|---|---|---|---|---|
| CN | 108808068 A | 11/2018 | | |
| CN | 110875491 A | 3/2020 | | |
| CN | 111129594 A | 5/2020 | | |
| CN | 109003835 B | 7/2020 | | |
| CN | 111710886 A * | 9/2020 | ............ | H01M 12/06 |
| JP | 2004-079321 A | 3/2004 | | |
| JP | 2010218937 A * | 9/2010 | | |
| JP | 2012-151395 A | 8/2012 | | |
| JP | 2012151088 A * | 8/2012 | | |
| KR | 20180022247 A | 3/2018 | | |

OTHER PUBLICATIONS

English Translation of JP2010218937A—Lithium secondary battery; Toyota Central Res & Dev; Sep. 30, 2010 (Year: 2010).*
English Translation of CN111710886A—Method for prolonging service life of metal-air battery; Changchun INST applied chemistry Cas; Sep. 25, 2020 (Year: 2020).*
English Translation of JP2012151088A—Negative electrode material for lithium ion secondary battery . . . ; Hitachi Chemical Co LTD; Aug. 9, 2012 (Year: 2012).*
Office Action dated May 26, 2025, issued in counterpart CN Application No. 202110364819.3. (9 pages).
Office Action dated Nov. 21, 2025, issued in counterpart CN Application No. 202110346819.3. (8 pages).

* cited by examiner

*Primary Examiner* — Adam J Francis
(74) *Attorney, Agent, or Firm* — WHDA, LLP

(57) ABSTRACT

An electrochemical device includes a negative active material layer and an electrolyte. The negative active material layer comprises hard carbon. The negative active material layer has a porosity of 20% to 60%. The electrolyte has a conductivity of 8 mS/cm to 14 mS/cm.

16 Claims, No Drawings

ELECTROCHEMICAL DEVICE AND ELECTRONIC DEVICE

CROSS REFERENCE TO RELATED APPLICATION

This application claims priority to the Chinese Patent Application Ser. No. 202110346819.3, filed on Mar. 31, 2021, the content of which is incorporated herein by reference in their entirety.

TECHNICAL FIELD

The application relates to the field of electrochemistry, and in particular to an electrochemical device and electronic device.

BACKGROUND

At present, 5G mobile phones have been widely promoted on the market, which brings about issues of battery energy consumption. Data show that the energy consumption of 5G is about 30%-50% higher than that of 4G, which also puts forward higher requirements for the energy density of the battery. Currently, most of the negative electrode materials in batteries use graphite. However, the capacity per gram of graphite (374 mAh/g) is relatively low, and the development of graphite materials for commercial applications is close to the theoretical capacity per grain. Therefore, there is an urgent need to develop negative electrode materials with a high capacity per gram so as to increase the energy density of the battery.

There are many kinds of negative electrode materials with a high capacity per gram, such as hard carbon, silicon, metal oxides and the like. The capacity per gram of hard carbon materials is higher than that of graphite, but the impedance of hard carbon increases when it is discharged in a low-charge state, which in turn causes the polarization of the battery to increase. After finishing the discharge and standing, the voltage rebounds greatly, and all the capacity of materials cannot be released, resulting in a certain loss of energy density.

SUMMARY

In view of the problems existing in the background art, the purpose of the present application is to provide an electrochemical device and electronic device, the electrochemical device has improved high temperature cycle performance, improved energy density, and reduced voltage rebound at the end of discharge process.

In some embodiments, the electrochemical device comprises: a negative electrode active material layer and an electrolyte; the negative electrode active material layer comprises hard carbon, and the negative electrode active material layer has a porosity of 20% to 60%; and the electrolyte has a conductivity of 8 mS/cm to 14 mS/cm.

In some embodiments, the hard carbon has a specific surface area of 2 m$^2$/g to 8 m$^2$/g.

In some embodiments, the hard carbon has a volume-based cumulative particle diameter D$_v$99 of 12 μm to 30 μm.

In some embodiments, the negative electrode active material layer has a compacted density of 0.8 g/cm$^3$ to 1.5 g/cm$^3$.

In some embodiments, the electrolyte comprises an organic solvent, and the solvent comprises at least one of ethyl propionate, propyl propionate, ethyl acetate, methyl propionate, dimethyl carbonate, diethyl carbonate, propylene carbonate, ethylene carbonate and diethyl carbonate.

In some embodiments, the negative electrode active material layer has a porosity of 40% to 60%.

In some embodiments, the electrolyte has a conductivity of 8 mS/cm to 12 mS/cm.

In some embodiments, the electrolyte comprises at least one of lithium hexafluorophosphate, lithium tetrafluoroborate, lithium hexafluoroarsenate, lithium perchlorate, lithium difluorophosphate, lithium bisfluorosulfonimide or lithium bistrifluoromethanesulfonimide.

In some embodiments, the electrochemical device has a discharge cut-off voltage of 1V to 2V.

In some embodiments, the electronic device comprises the electrochemical device as described in the present application.

The present application has the beneficial effects as follows: in the present application, the negative electrode active material layer comprising the hard carbon material has a porosity of 20% to 60%. A higher porosity can improve the electrolyte storage capacity of the electrode assembly and ensure the electrolyte replenishment during the cycle. Meanwhile, on the basis that the negative electrode active material layer comprising hard carbon with the high-porosity has an ability to retain liquid, the introduction of high kinetic electrolyte into the hard carbon chemical system can reduce the impedance of the hard carbon system in the state of low charge, increase the discharge capacity, improve the energy density of the electrochemical device, and the problem of electrolyte being unstable at high temperature and high voltage due to high kinetics, the consumption being accelerated, and the cycle performance being poor is improved. Further, because the impedance of the hard carbon in the state of low charge is large, the voltage rebounds greatly after the discharge is completed, and the capacity release is incomplete, resulting in loss of energy density. By reducing the discharge cut-off voltage, the residual capacity in the cell can be further released and the energy density of the electrochemical device can be increased.

Therefore, the electrochemical device of the present application has improved high-temperature cycle performance, increased energy density, and reduced voltage rebound at the end of discharge process.

DETAILED DESCRIPTION

It should be understood that the disclosed embodiments are merely examples of the application, and the application can be implemented in various forms. Therefore, the specific details disclosed herein should not be construed as limitations, but merely serve as the basis for the claims and serve as the representative basis to be used to teach those skilled in the art to implement this application in various ways.

In the description of this application, terms and professional words that are not explicitly described are common knowledge of those skilled in the art, and methods that are not explicitly described are conventional methods known to those skilled in the art. In the description of this application, a high kinetic electrolyte refers to electrolyte with a conductivity of 8 mS/cm to 14 mS/cm.

The electrochemical device of the application will be described in detail below.

The electrochemical device of the application may be any one selected from the following devices: lithium secondary batteries, supercapacitors, lithium-sulfur batteries, sodium ion batteries, lithium-air batteries, zinc-air batteries, aluminum-air batteries, and magnesium ion battery. In particular, the electrochemical device may be a lithium secondary battery.

[Positive Electrode Sheet]

In some embodiments, the electrochemical device comprises a positive electrode sheet.

The positive electrode sheet is a positive electrode sheet that is well known in the art and can be used in electrochemical devices. In some embodiments, the positive electrode sheet comprises a positive electrode current collector and a positive electrode active material layer disposed on the positive electrode current collector. In some embodiments, the positive electrode active material layer may comprise a positive electrode active material, a binder, and a conductive agent.

In some embodiments, the positive electrode active material comprises a composite oxide containing lithium and at least one selected from cobalt, manganese and nickel, including lithium cobaltate, a ternary positive electrode material, and the like.

The conductive agent is used to provide the positive electrode with conductivity and can improve the conductivity of the positive electrode. The conductive agent is a conductive material which is well-known in the art and can be used for the positive electrode active material layer. The conductive agent can be selected from any conductive material as long as it makes no chemical change. In some embodiments, the conductive agent includes at least one of carbon-based materials (for example, natural graphite, artificial graphite, carbon black, acetylene black, Ketjen black, carbon fiber), metal-based materials (for example, metal powders or metal fiber including copper, nickel, aluminum, silver, etc.) and conductive polymers (for example, polyphenylene derivatives).

The binder is a binder which is well-known in the art and can be used for the positive electrode active material layer. The binder can improve the binding performance between the positive electrode active material particles and that between the positive electrode active material particles and the positive electrode current collector. In some embodiments, the binder comprises at least one of polyvinyl alcohol, carboxymethyl cellulose, hydroxypropyl cellulose, diacetyl cellulose, polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, styrene butadiene rubber, acrylic (ester) styrene butadiene rubber, epoxy resin, and nylon.

In some embodiments, the structure of the positive electrode sheet is a structure of the positive electrode sheet which is well-known in the art and can be used in an electrochemical device.

In some embodiments, the preparation method of the positive electrode sheet is a preparation method of the positive electrode sheet which is well-known in the art and can be used in an electrochemical device. In some embodiments, in the preparation of the positive electrode slurry, the positive electrode active material and the binder are usually added, and the conductive material and the thickener are added as needed, and then they are dissolved or dispersed in the solvent to make the positive electrode slurry. The solvent is volatilized and removed during the drying process. The solvent is a solvent which is well-known in the art and can be used as a positive electrode active material layer, such as but not limited to N-methylpyrrolidone (NMP).

[Negative Electrode Sheet]

In some embodiments, the electrochemical device comprises a negative electrode sheet.

The negative electrode sheet is a negative electrode sheet which is well known in the art and can be used in electrochemical devices. In some embodiments, the negative electrode sheet comprises a negative electrode current collector and a negative electrode active material layer disposed on the negative electrode current collector.

In some embodiments, the negative electrode active material layer contains hard carbon and the negative electrode active material layer has a porosity of 20% to 60%. In this case, the electrolyte storage capacity of the cell during the preparation process can be improved, and the electrolyte replenishment during the cycle can be guaranteed. If the negative electrode active material layer has a porosity of less than 20%, due to insufficient liquid storage, the electrolyte will not be replenished after consumption, leading to deteriorate the cycle performance. The porosity of greater than 60% will cause the formation of the film to be unstable and consume too much lithium ions, thereby reducing energy density. In some embodiments, preferably, the negative electrode active material layer has a porosity of 40% to 60%. In some embodiments, the porosity of the negative electrode active material layer can be obtained by the measurement of a porosity tester.

When the negative electrode active material layer contains hard carbon and the negative electrode active material layer has a porosity of 20% to 60%, since hard carbon in the state of low charge has large impedance, the voltage rebounds greatly after the discharge is completed, and the capacity release is incomplete, resulting in loss of energy density. However, reduction of the discharge cut-off voltage of the electrochemical device can further release the residual capacity in the cell and increase the energy density. Therefore, in some embodiments, the discharge cut-off voltage of the electrochemical device is 1V to 2V.

In some embodiments, the hard carbon has a particle size $D_v99$ of 12 μm to 30 μm, where $D_v99$ is the particle size when the accumulation is 99% from the small diameter side in the cumulative distribution on a volume basis. The particle size $D_v99$ of the hard carbon can be obtained by testing with a particle size analyzer by a method well known in the art. In some embodiments, $D_v99$ can be obtained by the measurement of a sieving method, a specific surface area (BET) surface measurement method, or a laser diffraction analysis method.

The laser diffraction analysis method is to measure the intensity of the scattered light when the laser beam passes through the dispersed particle sample, and obtain the corresponding particle size. In some embodiments, $D_v99$ can be obtained by the measurement of laser diffraction analysis on a Malvern-type analyzer. The Malvern type analyzer is for example, but not limited to, Malvern 2000, Malvern MasterSizer (such as Mastersizer S), Malvern 2600, Mastersizer 3000, or Malvern 3600.

In some embodiments, the hard carbon has a specific surface area of 2 $m^2$/g to 8 $m^2$/g. If the hard carbon has a specific surface area of less than 2 $m^2$/g, it would lead to insufficient porosity, affect the electrolyte storage of the battery pole pieces, and deteriorate the cycle performance; a specific surface area of more than 8 $m^2$/g will cause the formation of the film to be unstable and consume too much lithium ions, thereby reducing the energy density. The specific surface area of hard carbon can be obtained by the measurement of a specific surface area tester. In some embodiments, the hard carbon precursor includes at least one of high molecular weight polymers, plants, and resins.

Different types of hard carbon precursor materials are combined with different process parameters to obtain hard carbon materials with a specific surface area of 2 m$^2$/g to 8 m$^2$/g, to in turn obtain a negative electrode active material layer with a porosity of 20% to 60%. Different types of hard carbon precursor materials are combined with different process parameters to obtain hard carbon materials with different specific surface areas, which technology is the prior art in this field and will not be described in details here.

In some embodiments, the negative electrode sheet has a compacted density of 0.8 g/cm$^3$ to 1.5 g/cm$^3$. If the negative electrode sheet has a compacted density of less than 0.8 g/cm$^3$, it would lead to lower adhesion force of the negative electrode sheet, which results in release of the active material and the collector and loss of electrical contact, thus affects the cycle performance. If the negative electrode sheet has a compacted density of greater than 1.5 g/cm$^3$, it would lead to insufficient porosity, which affects the battery electrode sheet storage, thus deteriorates the cycle performance. In some embodiments, the compacted density of the electrode sheet can be obtained by the measurement of a method well known in the art using a punching machine, a micrometer, or the like.

The conductive agent is used to provide electrical conductivity for the negative electrode and can improve the conductivity of the negative electrode. The conductive agent is a conductive material which is well known in the art and can be used for the negative electrode active material layer. The conductive agent can be selected from any conductive material as long as it makes no chemical change. In some embodiments, the conductive agent comprises at least one of carbon-based materials (for example, carbon nanotubes, natural graphite, artificial graphite, conductive carbon black, acetylene black, Ketjen black, carbon fiber), metal-based materials (for example, metal powders or metal fibers including copper, nickel, aluminum, silver, and so on) and conductive polymers (for example, polyphenylene derivatives).

The binder is a binder which is well known in the art and can be used for the negative electrode active material layer. In some embodiments, the binder includes at least one of styrene butadiene rubber (SBR), vinylidene fluoride-hexafluoropropylene copolymer (PVDF-co-HFP), polyvinylidene fluoride, polyacrylonitrile, poly-methylmethacrylate, Polyvinyl alcohol, carboxymethyl cellulose, hydroxypropyl cellulose, polyvinyl chloride, carboxylated polyvinyl chloride, polyvinyl fluoride, polymers containing ethylene oxide, polyvinylpyrrolidone, polyurethane, polytetrafluoroethylene polyethylene, polypropylene, acrylic (ester) styrene butadiene rubber, epoxy resin, and nylon.

In some embodiments, the negative electrode active material layer may comprise at least one of the following combinations: a combination of hard carbon, carbon nanotubes, and styrene-butadiene rubber; a combination of hard carbon, conductive carbon black, and polyvinylidene fluoride; a combination of hard carbon, artificial graphite and polyvinyl fluoride; a combination of hard carbon, Ketjen black and polyacrylonitrile. In some embodiments, preferably, the negative electrode active material layer comprises a combination of hard carbon, carbon nanotubes, and styrene-butadiene rubber, which combination can achieve further beneficial effects compared to other combinations.

In some embodiments, the structure of the negative electrode sheet is a structure of the negative electrode sheet which is well known in the art and can be used in an electrochemical device.

In some embodiments, the preparation method of the negative electrode sheet is a preparation method of the negative electrode sheet which is well-known in the art and can be used in an electrochemical device. In some embodiments, in the preparation of the negative electrode slurry, the negative electrode active material and the binder are usually added, and the conductive material and the thickener are added as needed, and then they are dissolved or dispersed in the solvent to make the negative electrode slurry. The solvent is volatilized and removed during the drying process. The solvent is a solvent which is well known in the art and can be used as the negative electrode active material layer, such as but not limited to water. The thickener (dispersant) is a thickener which is well known in the art and can be used as a negative electrode active material layer, such as but not limited to sodium carboxymethyl cellulose.

[Separator]

In some embodiments, the electrochemical device comprises an separator.

The separator is a separator which is well known in the art and can be used in electrochemical devices, such as, but not limited to, a polyolefin-based porous film. In some embodiments, the separator comprises a substrate and a coating.

In some embodiments, the substrate may comprise a single layer or multi-layer consisting of at least one of polyethylene (PE), polypropylene (PP), ethylene-propylene copolymer, ethylene-butene copolymer, ethylene-hexene copolymer, ethylene-methyl methacrylate copolymer.

In some embodiments, the coating includes an organic coating and/or an inorganic coating. In some embodiments, the organic coating comprises at least one of polyvinylidene fluoride, vinylidene fluoride-hexafluoropropylene copolymer, polyacrylonitrile, polyimide, acrylonitrile-butadiene copolymer, acrylonitrile-styrene-butadiene diene copolymer, polymethyl methacrylate, polymethyl acrylate, polyethyl acrylate, acrylic-styrene copolymer, polydimethylsiloxane, sodium polyacrylate, sodium carboxymethyl cellulose. In some embodiments, the inorganic coating comprises at least one of SiO$_2$, Al$_2$O$_3$, CaO, TiO$_2$, ZnO$_2$, MgO, ZrO$_2$, and SnO$_2$.

The present application does not particularly limit the shape and thickness of the separator. The preparation method of the separator is a preparation method of the separator which is well-known in the art and can be used in electrochemical devices.

[Electrolyte]

In some embodiments, the electrochemical device comprises an electrolyte.

In some embodiments, the electrolyte contains an electrolyte salt. The electrolyte salt is an electrolyte salt suitable for electrochemical devices, which is well known in the art. For different electrochemical devices, suitable electrolyte salts can be selected. For example, with respect to lithium ion batteries, lithium salt is generally used as the electrolyte salt.

According to some embodiments of the present application, the lithium salt may be selected from one or more of inorganic lithium salt and organic lithium salt. In some embodiments, the lithium salt includes at least one of lithium hexafluorophosphate, lithium tetrafluoroborate, lithium hexafluoroarsenate, lithium perchlorate, lithium difluorophosphate, lithium bisfluorosulfonimide, or lithium bistrifluoromethanesulfonimide. For this application, lithium tetrafluoroborate is non-toxic and safe, lithium hexafluoroarsenate has high conductivity and strong negative electrode film-forming performance, and lithium bistrifluoromethanesulfonimide has good thermal stability and high conductivity. Moreover, addition of one or more of the above-mentioned lithium salts to the electrolyte can make the electrolyte have better stability and higher safety performance.

According to some embodiments of the application, electrolytes with different conductivity can be obtained by adjusting the type and/or concentration of the lithium salt in the electrolyte.

In some embodiments, the electrolyte has a conductivity of 8 mS/cm to 14 mS/cm. When the electrolyte has a conductivity of lower than 8 mS/cm, it will deteriorate the voltage rebound and reduce the energy density, and at the same time, it will cause insufficient dynamics for the electrochemical device and deteriorate cycle performance. However, when the electrolyte has a conductivity of greater than 14 mS/cm, it will cause the electrolyte to become unstable at high temperature and increase the side effects, thereby deteriorating the cycle performance. In some embodiments, preferably, the electrolyte has a conductivity of 8 mS/cm to 12 mS/cm.

In some embodiments, when the negative electrode active material layer comprises hard carbon and has a porosity of 20% to 60%, introduction of a high-kinetic electrolyte (electrolyte having a conductivity of 8 mS/cm to 14 mS/cm) into this chemical system, enables to reduce the impedance of the hard carbon negative electrode system in the state of low charge, increase the discharge capacity, and increase the energy density of the battery; meanwhile, use of the high liquid retention capacity for hard carbon improves the problem of the electrolyte being unable at high temperature and high voltage, having faster consumption and poor circulation due to the high dynamics.

In some embodiments, the electrolyte further comprises an organic solvent. The organic solvent is an organic solvent which is well-known in the art and is suitable for electrochemical devices. In some embodiments, the organic solvent comprises at least one of ethyl propionate, propyl propionate, ethyl acetate, methyl propionate, dimethyl carbonate, diethyl carbonate, propylene carbonate, ethylene carbonate, and diethyl carbonate.

In some embodiments, the electrolyte further comprises additives. The additives are additives which are well-known in the art and are suitable for electrochemical devices, and can be added according to the required performance of the electrochemical device.

The configuration of the electrolyte can be prepared by a method well known to those skilled in the art, and its composition can be selected according to actual needs.

Next, the electronic device of the application will be explained.

The electronic device of the application can be any electronic device, such as but not limited to a notebook computer, a pen input computer, a mobile computer, an e-book player, a portable phone, a portable fax machine, a portable copier, a portable printer, a head-mounted stereo headset, Video recorders, LCD TVs, portable cleaners, portable CD players, mini discs, transceivers, electronic notebooks, calculators, memory cards, portable recorders, radios, backup power supplies, motors, automobiles, motorcycles, assisted bicycles, bicycles, Lighting device, toys, game consoles, clocks, power tools, flashlights, cameras, large household storage batteries, lithium ion capacitors. It is noted that, in addition to the electronic device listed above, the electrochemical device of the application is also applicable to energy storage power stations, marine transport vehicles, and air transport vehicles. Air transport vehicles include those in the atmosphere and outside the atmosphere.

In some embodiments, the electronic device comprises the electrochemical device as described in the application.

Hereinafter, the application will be further explained in conjunction with the examples. It should be understood that these examples are merely used to illustrate the application and not to limit the scope thereof. In the following examples and comparative examples, the reagents, materials, etc. used are all commercially available or synthetically available unless otherwise specified. The "lithium ion battery" in the following examples and comparative examples is an "electrochemical device" according to some examples of the present application.

The lithium ion batteries of Examples 1 to 23 and Comparative Example 1 were all prepared according to the following methods.

(1) Preparation of the Positive Electrode Sheet

A positive electrode active material lithium cobaltate (which had a molecular formula of $LiCoO_2$), a conductive agent conductive carbon black, and an adhesive polytetrafluoroethylene (PTFE) were dissolved in a solvent at a mass ratio of 97:1.5:1.5 to obtain a mixture, and then the mixture was stirred and mixed thoroughly to form a uniform positive electrode slurry. The positive electrode slurry was uniformly coated on the aluminum foil by the means of extrusion coating to form the positive electrode active material layer. After one-time cold pressing and slitting, the positive electrode sheet was obtained. Among them, the relevant parameters for the positive electrode sheets in Examples 1-23 and Comparative Example 1 were exactly the same.

(2) Preparation of the Negative Electrode Sheet

Hard carbon as a negative electrode active material, carboxymethyl cellulose (CMC) as a dispersant, styrene butadiene rubber (SBR) as a binder, and carbon nanotube as a conductive agent were kneaded, stirred, and mixed in a solvent at a mass ratio of 98:0.5:1:0.5, allowing it to form a uniform negative electrode slurry. The negative electrode slurry was uniformly coated on the copper foil by extrusion coating to form a negative electrode active material layer. After cold pressing and slitting, the negative electrode sheet was obtained. Among them, the relevant parameters for the hard carbon, the negative electrode active material layer, and the negative electrode sheet in Examples 1-23 and Comparative Example 1 were shown in Table 1.

(3) Preparation of the Separator

A PE porous polymer film was used as the separator.

(4) Preparation of the Electrolyte

The preparation of the electrolyte was carried out under a dry argon atmosphere. Ethylene carbonate (EC), propylene carbonate (PC), diethyl carbonate (DEC), and propyl propionate (PP) were mixed at a mass ratio of EC:PC:DEC:PP=10:15:35:20 to form a mixed solution. Lithium hexafluorophosphate ($LiPF_6$) as the lithium salt was dissolved in the mixed solution to obtain the electrolyte. In the Examples and the Comparative Examples of the present application, electrolytes with different conductivity could be obtained by adjusting the concentration of the added $LiPF_6$. Among them, the conductivity parameters for the electrolyte in the Examples and Comparative Example 1 were shown in Table 1.

(5) Preparation of the Lithium-Ion Batteries

The positive electrode sheet, the separator, and the negative electrode sheet made through the above-mentioned steps were laminated in order, so that the separator was located between the positive electrode sheet and the negative electrode sheet for isolation, which was then wound to obtain an electrode assembly. The electrode assembly was placed in the outer packaging foil leaving the liquid injection port, and the electrolyte prepared above was poured from the liquid injection port. The preparation of the lithium ion battery was completed via the procedures of vacuum packaging, standing, forming, and shaping.

Next, the performance test process for the lithium ion batteries in Examples 1 to 23 and Comparative Example 1 will be described.

(1) High Temperature Cycle Performance Test

Under the condition of 45° C., the high-temperature cycle performance test for the lithium-ion battery was carried out by the constant current-constant voltage method. The battery was charged at a constant current of 3 C to 4.4 V. and then charged at a constant voltage of 4.4 V to 0.05 C. Then, it was discharged at 1 C up to the discharge cut-off voltage in the Examples and the Comparative Examples, and the discharge capacity data was recorded. According to the above-mentioned steps, the ratio of the discharge capacity obtained by cycling the battery for 500 cycles to the first cycle discharge capacity was the capacity retention rate.

(2) Test of the First Cycle Discharge Voltage Rebound

The battery was discharged at 1 C up to the discharge cut-off voltage in the Examples and the Comparative Examples, and the battery voltage V1 was recorded. After standing still for 10 minutes, the battery voltage V2 was recorded, and V2−V1 was the first cycle discharge voltage rebound.

(3) Test of Porosity of the Negative Electrode Active Material Layer 10 pieces of pole piece samples with a size of 50 mm×100 mm were taken out. 10 pieces of the negative electrode active material layers were placed in a true porosity tester (Model: AccuPyc II 1340). The porosity of the sample was tested, and the true volume $Vo_1$ of the sample was measured out. Then, the thickness T for 10 pieces of samples was tested with a ten-thousand-point thickness gauge, and the apparent volume of the sample was calculated as $Vo_{10}=50\times 100\times T$, and the calculated value of the sample is $(Vo^{10}-Vo_1)/Vo_{10}\times 100\%$.

(4) Test of the Compacted Density for the Negative Electrode Active Material Layer The compacted density of the negative electrode active material layer was obtained by the following process: 1) the negative electrode sheet was made into a 1540.25 mm² wafer by a punching machine, and its mass was recorded as M1; 2) the copper foil of the same material as the negative electrode current collector was taken and the empty copper foil with the same area as the wafer in step 1) was weighed, and its mass was recorded as M2; 3) the thickness of the wafer was measured by a 1/10 micrometer and recorded as H1, and the thickness of the empty copper foil was recorded as H2; 4) the compacted density of the negative electrode active material layer was calculated according to the equation: $(M1-M2)/(H1-H2)\times 1540.25$.

(5) Test of the Specific Surface Area Test of the Hard Carbon

The specific surface area of the hard carbon was obtained by the SSA-3600 specific surface area tester from BEIJING BUILDER ELECTRONIC TECHNOLOGY CO., LTD. The test steps comprised: a helium-nitrogen mixed gas (volume ratio 4:1) was continuously passed through a U-shaped tube filled with a certain mass of hard carbon sample: the nitrogen in the mixed gas could be adsorbed in a liquid nitrogen environment. When the adsorption became saturated, the liquid nitrogen cup would drop, and the adsorbed nitrogen in the sample would be desorbed. The concentration change value during the gas adsorption and desorption process was detected and recorded by TCD. After the peak was cut, the specific surface area value of the sample was obtained by comparing the desorption peak area of the standard sample and that of the tested sample and calculating it.

(6) Test of Particle Size $D_v99$ of the Hard Carbon

The particle size $D_v99$ of the hard carbon was measured by the Mastersizer laser diffraction particle size distribution measuring device from Malvern Company.

The relevant parameters of the lithium ion battery and the performance test results thereof involved in Examples 1-23 and Comparative Example 1 were shown in Tables 1 to 2, respectively.

TABLE 1

| | Particle size of the hard carbon $D_v99/\mu m$ | Specific surface area of the hard carbon/m²/g | Compacted density of the negative electrode active material layer/g/cm³ | Porosity of the negative electrode active material layer/% | Electrolyte conductivity/mS/cm | Discharge cut-off voltage/V |
|---|---|---|---|---|---|---|
| Ex. 1 | 30 | 2 | 0.8 | 20 | 8 | 2 |
| Ex. 2 | 30 | 2 | 0.8 | 20 | 8 | 2 |
| Ex. 3 | 20 | 2 | 0.8 | 23 | 8 | 2 |
| Ex. 4 | 25 | 2 | 0.8 | 22 | 8 | 2 |
| Ex. 5 | 25 | 4 | 0.8 | 35 | 8 | 2 |
| Ex. 6 | 25 | 6 | 0.8 | 48 | 8 | 2 |
| Ex. 7 | 25 | 8 | 0.8 | 60 | 8 | 2 |
| Ex. 8 | 25 | 1.5 | 0.8 | 17 | 8 | 2 |
| Ex. 9 | 25 | 8.5 | 0.8 | 63 | 8 | 2 |
| Ex. 10 | 25 | 8 | 1.0 | 42 | 8 | 2 |
| Ex. 11 | 25 | 8 | 1.3 | 36 | 8 | 2 |
| Ex. 12 | 25 | 8 | 1.5 | 25 | 8 | 2 |
| Ex. 13 | 25 | 8 | 1.6 | 18 | 8 | 2 |
| Ex. 14 | 25 | 8 | 0.5 | 65 | 8 | 2 |
| Ex. 15 | 25 | 8 | 0.8 | 60 | 10 | 2 |
| Ex. 16 | 25 | 8 | 0.8 | 60 | 12 | 2 |
| Ex. 17 | 25 | 8 | 0.8 | 60 | 14 | 2 |
| Ex. 18 | 25 | 8 | 0.8 | 60 | 15 | 2 |
| Ex. 19 | 25 | 8 | 0.8 | 60 | 7 | 2 |
| Ex. 20 | 25 | 8 | 0.8 | 60 | 14 | 1.5 |
| Ex. 21 | 25 | 8 | 0.8 | 60 | 14 | 1 |

TABLE 1-continued

| | Particle size of the hard carbon $D_v99/\mu m$ | Specific surface area of the hard carbon/$m^2/g$ | Compacted density of the negative electrode active material layer/$g/cm^3$ | Porosity of the negative electrode active material layer/% | Electrolyte conductivity/mS/cm | Discharge cut-off voltage/V |
|---|---|---|---|---|---|---|
| Ex. 22 | 25 | 8 | 0.8 | 18 | 7 | 2 |
| Ex. 23 | 25 | 8 | 0.8 | 65 | 15 | 2 |
| Com. Ex. 1 | — | — | — | 10 | 8 | 2 |

Note:
"—" indicates that there is no corresponding data.

TABLE 2

| | Battery capacity retention rate after 500 cycles at 45° C./% | First cycle discharge voltage rebound/V |
|---|---|---|
| Ex. 1 | 82.3% | 0.72 |
| Ex. 2 | 84.7% | 0.70 |
| Ex. 3 | 87.2% | 0.74 |
| Ex. 4 | 82.3% | 0.71 |
| Ex. 5 | 84.1% | 0.72 |
| Ex. 6 | 86.3% | 0.72 |
| Ex. 7 | 84.6% | 0.73 |
| Ex. 8 | 62.0% | 0.76 |
| Ex. 9 | 83.4% | 0.72 |
| Ex. 10 | 82.5% | 0.73 |
| Ex. 11 | 81.9% | 0.75 |
| Ex. 12 | 80.8% | 0.75 |
| Ex. 13 | 70.5% | 0.73 |
| Ex. 14 | 35.9% | 0.75 |
| Ex. 15 | 84.5% | 0.60 |
| Ex. 16 | 83.2% | 0.55 |
| Ex. 17 | 81.5% | 0.46 |
| Ex. 18 | 67.0% | 0.40 |
| Ex. 19 | 78.0% | 0.80 |
| Ex. 20 | 81.4% | 0.40 |
| Ex. 21 | 81.2% | 0.35 |
| Ex. 22 | 80.1% | 0.80 |
| Ex. 23 | 37.9% | 0.43 |
| Com. Ex. 1 | 20.5% | 0.73 |

By comparing Examples 1 to 23, it can be seen that when the negative electrode active material layer has a porosity of 20% to 60% and the electrolyte has a conductivity of 8 mS/cm to 14 mS/cm, the lithium ion battery has better electrical performance. When the negative electrode active material layer has a porosity of 40% to 60% and the electrolyte has a conductivity of 8 mS/cm to 12 mS/cm, the electrical performance of the lithium ion battery is further improved. Too low conductivity of the electrolyte and insufficient kinetics of the battery electrolyte results in deterioration of cycle performance; while too high conductivity of the electrolyte, more linear solvent contents and intensified side effects at a high temperature results in deterioration of cycle performance. However, too low porosity of the hard carbon and insufficient retention amount of the electrolyte and fast consumption of the electrolyte cause the circulation problem; while too high porosity of the hard carbon and a large area of the hard carbon in contact with the electrolyte would make the moisture in the electrolyte produce side reaction with the hard carbon, destroy its structure and in turn affect circulation. At the same time, too much water does not facilitate the formation of SEI film. Therefore, the inventors of the present application have conducted a large number of experiments to obtain a preferred matching range of the porosity for the negative electrode active material layer with the conductivity for the electrolyte, so as to obtain a lithium ion battery with better electrical performance.

By comparing Examples 1-7 and Comparative Example 1, it can be seen that in the case of different specific surface areas of the hard carbon and particle sizes of the hard carbon, the high-porosity negative electrode active material layer combined with the high-kinetic electrolyte can realize good cycle performance of the lithium ion battery at high temperature and high pressure. Therefore, the negative electrode active material layer with high porosity can bring out high liquid retention effect, as well as improve the circulation problem of high-kinetic electrolyte due to fast electrolyte consumption.

By comparing Example 8 and Example 4, it can be seen that after reducing the specific surface area to 1.5 $m^2/g$, the negative electrode active material layer has a porosity of 17%, and the cycle performance of the lithium ion battery is significantly deteriorated. From this, reduction of the specific surface area would affect the porosity, and thus cannot store more electrolyte, which leads to the deterioration of cycle performance caused by fast electrolyte consumption. Therefore, the porosity of the negative electrode active material layer must be guaranteed to be 20% or more, and specific surface area of the hard carbon is preferably not less than 2 $m^2/g$.

By comparing Example 9 and Example 4, it can be seen that when the specific surface area of the hard carbon is increased to 8.5 $m^2/g$, the porosity of the negative electrode active material layer reaches 63%, and the cycle performance of the lithium ion battery is significantly deteriorated. From this, increase of the specific surface area enables to increase the porosity, but it will cause the energy density to decrease. The possible reason is the high porosity of the negative electrode active material layer, which consumes more lithium ions during film forming, resulting in more side reactions and unstable film formation. It leads to a reduction in first efficiency, serious lithium ion consumption, and deterioration of the energy density for lithium-ion batteries. Therefore, the porosity of the negative electrode active material layer must be ensured to be 60% or less, and the specific surface area of the hard carbon is preferably not greater than 8 $m^2/g$.

By comparing Example 13 and Example 12, it can be seen that when the negative electrode sheet has a compacted density of greater than 1.5 $g/cm^3$ and the porosity of the negative electrode active material layer is reduced to 20% or less, the cycle performance of the lithium ion battery is significantly deteriorated. This is mainly because that the larger compacted density will cause the reduced pores of the negative electrode active material layer, the lowered storage capacity of the electrolyte, and the insufficiently replenished electrolyte after the electrolyte is consumed during the cycle.

By comparing Example 14 and Example 12, it can be seen that when the compacted density of the negative electrode sheet is smaller (0.7 $g/cm^3$), the cycle performance of the lithium-ion battery is significantly deteriorated. This is mainly because that the smaller compacted density causes the negative electrode sheet with low adhesion, which causes the active material to separate from the current collector and lose electrical contact, thereby affecting the cycle performance.

By comparing Examples 15, 16, 17 and Example 7, it can be seen that increase of the conductivity for the electrolyte can reduce the amount of voltage rebound after discharging and standing, and increase the energy density of the lithium ion battery, and the increase extent is positively correlated with the conductivity of the electrolyte.

By comparing Example 18 and Example 7, it can be seen that when the electrolyte conductivity is relatively high, the cycle performance of the lithium ion battery becomes worse. This is mainly because that the linear solvent accounts for more, and high-temperature side reactions are aggravated, leading to cycle failure.

By comparing Example 19 and Example 7, it can be seen that reduction of the electrolyte conductivity will cause to increase the voltage rebound of the lithium-ion battery, decrease the energy density, and deteriorate the cycle performance (this is mainly due to the insufficient kinetics of the battery electrolyte, resulting in deterioration of cycle performance).

By comparing Examples 20, 21 and Example 17, it can be seen that further reducing the discharge cut-off voltage can reduce the voltage rebound after finishing discharge of the lithium-ion battery, and increase the energy density of the lithium-ion battery. Therefore, lowering the discharge cut-off voltage can release the residual capacity in the lithium ion battery and increase its energy density.

It can be seen from the above-mentioned examples and comparative examples that the high-porosity negative electrode active material layer containing hard carbon in combination with the high-kinetic electrolyte can effectively improve the problems of circulation of the high-kinetic electrolyte system and the large resistance of the hard carbon system. Meanwhile, combined with lowering the discharge cut-off voltage, it can further increase the energy density of lithium-ion batteries. This is mainly due to two points: one is the use of the high-kinetic electrolyte with the high conductivity to reduce the diffusion resistance of the lithium-ion battery, thereby reducing the impedance in the low-charge state as well as releasing the residual capacity; the second is the use of a negative electrode active material layer containing hard carbon with high porosity enhances the liquid retention capacity of the lithium-ion battery, and improves the problem of poor cycle performance for the high-kinetic electrolyte due to the rapid consumption of electrolyte at high temperature and high pressure.

The above are only examples of the application, and do not limit the application in any form. Although the application is disclosed as above in preferred embodiments, it is not intended to limit the application. Any person familiar with the profession will make some changes or modifications to the technical content disclosed above without departing from the scope of the technical solution in the present application, all of which is equivalent to equivalent implementation cases and falls within the scope of the technical solution in the present application.

The invention claimed is:

1. An electrochemical device, comprising: a negative electrode active material layer comprising a negative electrode active material, and an electrolyte; wherein, the negative electrode active material is hard carbon having a specific surface area of 2 $m^2/g$ to 8 $m^2/g$ and a volume-based Dv99 of 12 μm to 30 μm;

the negative electrode active material layer has a porosity of 20% to 60%; and the electrolyte has a conductivity of 8 mS/cm to 14 mS/cm.

2. The electrochemical device according to claim 1, wherein the negative electrode active material layer has a compacted density of 0.8 $g/cm^3$ to 1.5 $g/cm^3$.

3. The electrochemical device according to claim 1, wherein the electrolyte comprises an organic solvent; and the organic solvent comprises at least one selected from the group consisting of ethyl propionate, propyl propionate, ethyl acetate, methyl propionate, dimethyl carbonate, diethyl carbonate, propylene carbonate, ethylene carbonate and diethyl carbonate.

4. The electrochemical device according to claim 1, wherein the negative electrode active material layer has a porosity of 40% to 60%.

5. The electrochemical device according to claim 1, wherein the electrolyte has a conductivity of A mS/cm, 8 mS/cm≤A<10 mS/cm.

6. The electrochemical device according to claim 1, wherein the electrolyte comprises at least one selected from the group consisting of lithium hexafluorophosphate, lithium tetrafluoroborate, lithium hexafluoroarsenate, lithium perchlorate, lithium difluorophosphate, lithium bisfluorosulfonimide and lithium bistrifluoromethanesulfonimide.

7. The electrochemical device according to claim 1, wherein the electrochemical device has a discharge cut-off voltage of 1V to 2V.

8. An electronic device comprising an electrochemical device, wherein, the electrochemical device comprises a negative electrode active material layer comprising a negative active material, and an electrolyte;

the negative electrode active material is hard carbon having a specific surface area of 2 $m^2/g$ to 8 $m^2/g$ and a volume-based Dv99 of 12 μm to 30 μm;

the negative electrode active material layer has a porosity of 20% to 60%; and the electrolyte has a conductivity of 8 mS/cm to 14 mS/cm.

9. The electronic device according to claim 8, wherein the negative electrode active material layer has a compacted density of 0.8 $g/cm^3$ to 1.5 $g/cm^3$.

10. The electronic device according to claim 8, wherein the electrolyte comprises an organic solvent; and the organic solvent comprises at least one selected from the group consisting of ethyl propionate, propyl propionate, ethyl acetate, methyl propionate, dimethyl carbonate, diethyl carbonate, propylene carbonate, ethylene carbonate and diethyl carbonate.

11. The electronic device according to claim 8, wherein the negative electrode active material layer has a porosity of 40% to 60%.

12. The electronic device according to claim 8, wherein the electrolyte has a conductivity of A mS/cm, 8 mS/cm≤A<10 mS/cm.

13. The electronic device according to claim 8, wherein the electrolyte comprises at least one selected from the group consisting of lithium hexafluorophosphate, lithium tetrafluoroborate, lithium hexafluoroarsenate, lithium perchlorate, lithium difluorophosphate, lithium bisfluorosulfonimide and lithium bistrifluoromethanesulfonimide.

14. The electronic device according to claim 8, wherein the electrochemical device has a discharge cut-off voltage of 1V to 2V.

15. The electronic device according to claim 1, wherein the electrolyte has a conductivity of A mS/cm, 10 mS/cm<A≤14 mS/cm.

16. The electronic device according to claim 8, wherein the electrolyte has a conductivity of A mS/cm, 10 mS/cm<A≤14 mS/cm.

\* \* \* \* \*